Oct. 4, 1927.
H. GERDIEN
1,644,333
DEVICE FOR DETERMINING A DIFFERENCE IN LENGTH
Filed March 5, 1924
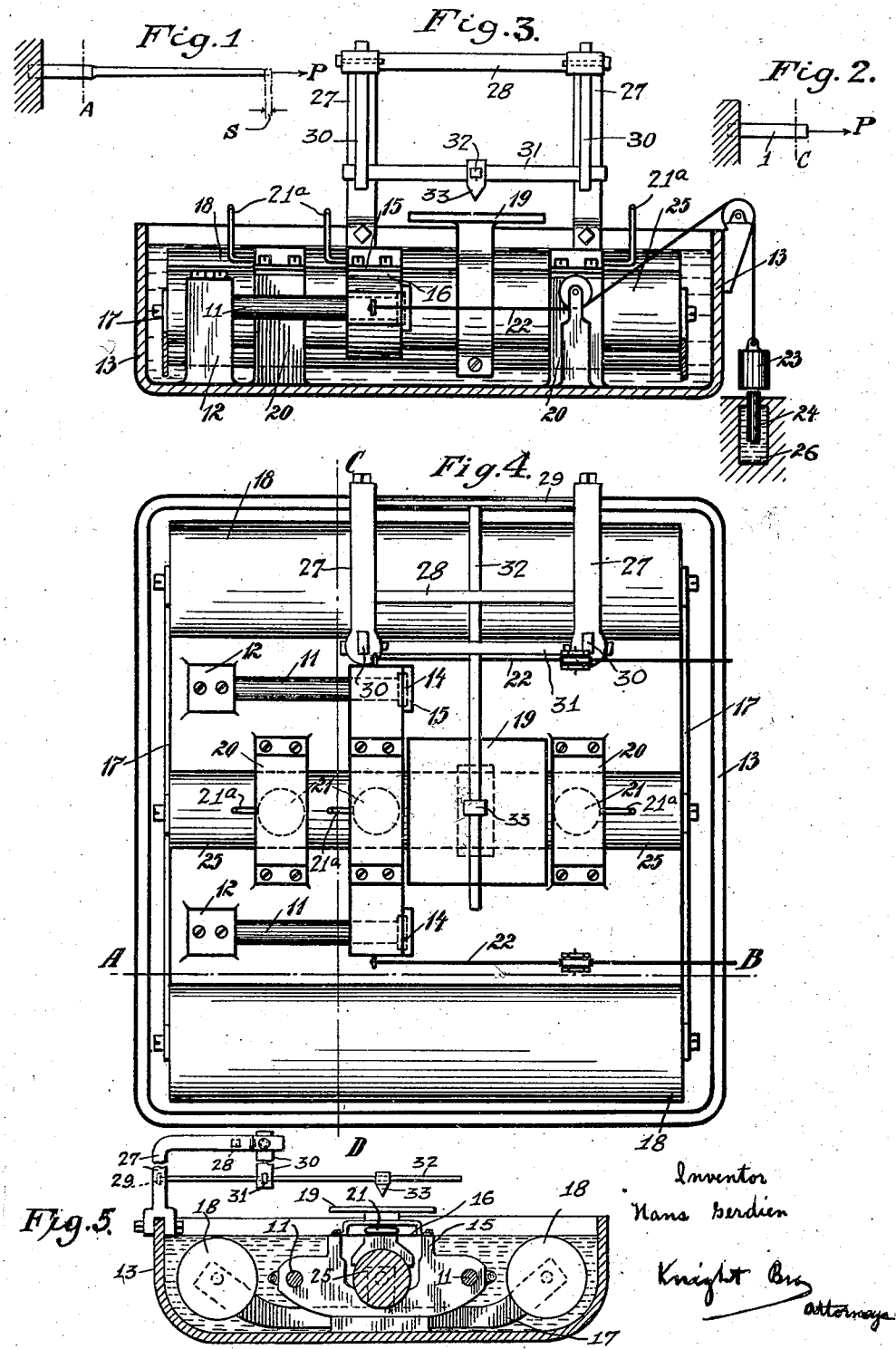
Inventor
Hans Gerdien
Knight Bros
attorneys Patented Oct. 4, 1927.

1,644,333

UNITED STATES PATENT OFFICE.

HANS GERDIEN, OF BERLIN-GRUNEWALD, GERMANY, ASSIGNOR TO SIEMENS & HALSKE, AKTIENGESELLSCHAFT, OF SIEMENSSTADT, NEAR BERLIN, GERMANY, A CORPORATION OF GERMANY.

DEVICE FOR DETERMINING A DIFFERENCE IN LENGTH.

Application filed March 5, 1924, Serial No. 697,038, and in Germany March 6, 1923.

My invention relates to improvements in the method of determining a difference in length.

In order to determine very small differences in length an elastic body is according to my invention deformed by applying to it a mechanical force. The magnitude of the elastic deformation may be measured in two different ways.

Firstly, two marks may be provided upon the elastic body in such a manner, that during the elastic deformation of the body the travel of one mark, the magnitude of travel of which is read off directly, is a multiple of the travel of the other mark, the magnitude of travel of which corresponds with the length to be measured. The elastic body replaces in this case a lever of great transmission ratio and compared with a lever it has the advantage, that it possesses no movable bearing points with the unavoidable play.

Secondly, the magnitude of the elastic deformation can be measured by the amount of the force by which the deformation is caused. The dimensions of the elastic body can hereby easily be so proportioned, that comparatively large accurately measurable variations of the force cause very small deformations. The actual not directly measurable value of the deformation may be determined either by calculation only, or the force applied to the elastic body may be so great, that the body suffers a large deformation, which may be measured with sufficient accuracy and from this the no longer directly measurable deformation at a lower load may be determined by calculation.

In the drawing affixed hereto and forming part of my specification are shown several embodiments of my invention.

Figs. 1 and 2 are explanatory diagrams and illustrate the principle involved in the two above described kinds of measurement, Fig. 3, illustrates a dividing apparatus, operating according to this invention, in longitudinal section along line A—B, Fig. 4, Fig. 4 a top view of this apparatus and Fig. 5 a cross-section along line C—D, Fig. 4.

Referring to Figure 1, 1 is a rod of elastic material fixed at its left-hand end and is assumed to be under strain of tension caused by a force P engaging it at its right-hand end. The linear stretching S which the rod suffers owing to the action of the force P is then measured and from this stretching S the microscopically small stretching is measured, which the point A has travelled to the right. Beyond the rod portion which contains the point A the cross-section of the rod is reduced, in order to obtain large measuring distances without excessively great rod lengths.

Referring to Fig. 2 a rod 1 is shown fixed at its left-hand end and is adapted to be put under strain of tension by a force P. By the value of this force P the distance is measured by which the point indicated by the letter C moves along during the expansion of the rod. The two methods of measuring illustrated in the Figs. 1 and 2 may also be combined by measuring, for instance in an appliance constructed according to Fig. 1, not the expansion S, but the force P.

Figs. 3, 4 and 5 show a dividing apparatus operating according to this method. In an open vessel 13 are arranged two standards 12 and two elastic rods 11 are firmly clamped in them at one end. The free ends of the rods 11 are provided with heads 14 and connected by a bridge piece 15. Parallel to the bridge-piece 15 two standards or uprights 20 are fixed upon the bottom of the vessel 13. These standards 20 and the central portion of bridge 15 are constructed in the manner of two-part bearings, as will appear from Fig. 5, the upper part of each bearing being carried by a flat spring 16. Each upper bearing half can be lowered by an air cushion 21 against the elastic resistance of its spring 16. The air cushions 21 may be individually inflated through suitable pipe connections diagrammatically indicated at 21ª in Figs. 3 and 4. In the bores of the standards 20 and the bridge 15 is supported a steel cylinder 25, which by means of plates 17 fixed upon its front faces is rigidly connected with two floats 18. The trough 13 is filled with oil and the floats are so dimensioned, that they are just capable of carrying all the movable parts. On the steel cylinder 25 is clamped a table 19 upon which may be placed the objects, which are to be provided with a graduation or division. To the ends of the bridge 15 are attached two cords 22 which are passed around suitably disposed guide pulleys and at the free ends of which weights 23 are suspended. Below each of the weights a plunger piston 24 is disposed and located in a cylinder 26. These cylinders may be supplied by pressure fluid in any suitable and conventional manner not shown here. When it is desired to deform rods 11, cylinders 26 are emptied so that the plunger pistons permit the full weight of weights 23 to go into effect. If it is desired after the deformation has occurred to release the strain upon the rods, pressure fluid is supplied to cylinders 26 so that the plunger pistons 24, together with weights 23 are lifted. To a fixed point of the entire apparatus, for instance at one of the container walls running in parallel to cylinder 25, two brackets 27 are fixed which are reinforced and braced against each other by transverse beams 28 and 29. At the ends of brackets 27 two vertical bars 30 are arranged which again are braced against each other by means of a transverse bar 31. To the middle of the two bars 29 and 31 a bar 32 is fastened which extends across table 19 and which serves as a guide for the marker, for instance the diamond 33.

The apparatus operates in the following manner.

On the table 19 is mounted the object which is to be provided with a division. Compressed air is then introduced into the air cushion 21 of the bridge 15, so that the cylinder 25 is gripped by the bridge 15. In this way the table 19 becomes rigidly connected with the ends of the rods 11. Now the pistons 24 are lowered so that the rods 11 are loaded and thus stretched by the weights 23. Now the first division line is drawn by means of the marker 33 by moving the marker on the guide 32 across the table 19 in a direction transversely to the axis of cylinder 25. Then the air cushions upon the standards 20 are inflated and thereupon the cushion of the bridge 15 is deflated, so that the cylinder 25 is now held stationary in the standards 20. Now the weights 23 are raised by the pistons 24, so that the previously stretched rods 11 return to their original length, carrying the bridge 15 along. Now the cylinder 25 is again clamped to the bridge 15 and released from the standards 20 as previously described, so that on lowering the plungers 24, and on thus bringing again into effect the weights 23, rods 11, again stretch the same distance as before and thus the table 19 again moves to the right the same distance as before, whereupon the next graduation line may be drawn with the engraving tool 33.

The device described by way of example clearly shows the advantage of the invention over the hitherto known devices for the same purpose. Besides the high accuracy attainable its advantage resides primarily in the fact that periodical errors in the dividing process are entirely eliminated and that the accuracy is not diminished by any wear and tear of the device.

What I claim as my invention is:

1. In a dividing machine of the character described, the combination of a main base plate, an elastic body fixed at one end to said plate, means for applying a definite mechanical force to the other end of said body to deform it a predetermined extent, a movable table for supporting the object to be divided, said table having means for alternately attaching it to said elastic body to follow the deformations of the latter when said force is applied, and to the main base plate while the deforming force is released, and a marker mounted above said table and adapted to mark the object when said body is deformed, said marker being fixed with respect to the deformation direction of said body.

2. In a dividing machine of the character described, the combination of a main base plate, an elastic body fixed at one end to said plate, means for applying a definite mechanical force to the other end of said body to deform it a predetermined extent, a movable table for supporting the object to be divided, said table having means for alternately clamping it to said elastic body to follow the deformations of the latter when said force is applied, and to the main base plate while the deforming force is released, and a marker mounted above said table and adapted to mark the object when said body is deformed, said marker being fixed with respect to the deformation direction of said body.

3. In a dividing machine of the character described, the combination of a main base plate, an elastic body fixed at one end to said plate, means for applying a definite mechanical force to the other end of said body to deform it a predetermined extent, a guide and a table fixed to said guide and adapted to support the object to be divided, said guide being slidingly mounted on said base plate in the direction of deformation of said body, means for alternately clamping said guide to said body, to follow its deformation when said force is applied, and to said base plate while said deforming force is released, and a marker mounted above said table and movable in a direction transverse to the deformation direction, for marking the object when the body is deformed.

In testimony whereof I affix my signature.

HANS GERDIEN.